United States Patent
Wagner

(10) Patent No.: US 8,977,529 B2
(45) Date of Patent: Mar. 10, 2015

(54) METHOD AND APPARATUS FOR PROVIDING ON-BOARD DIAGNOSTICS

(75) Inventor: Ronald E. Wagner, Fleming Island, FL (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 238 days.

(21) Appl. No.: 12/807,923

(22) Filed: Sep. 16, 2010

(65) Prior Publication Data

US 2014/0052418 A1 Feb. 20, 2014

Related U.S. Application Data

(60) Provisional application No. 61/342,133, filed on Apr. 9, 2010.

(51) Int. Cl.
*G06G 7/48* (2006.01)

(52) U.S. Cl.
USPC .................................................. 703/8; 703/2

(58) Field of Classification Search
CPC ............ G06F 17/5018; G06F 17/5036; G06F 17/5009; G06F 2217/16; G06F 17/5095; G06F 2212/173; G05B 17/02
USPC ........................................................ 703/2, 8
See application file for complete search history.

(56) References Cited

U.S. PATENT DOCUMENTS

| 7,260,501 B2* | 8/2007 | Pattipatti et al. ............... 702/183 |
| 2004/0168100 A1* | 8/2004 | Thottan et al. .................... 714/4 |

* cited by examiner

*Primary Examiner* — Saif Alhija
(74) *Attorney, Agent, or Firm* — Daniel J. Long; Prakash Nama

(57) ABSTRACT

On-board diagnostics for fleet maintenance is improved by embedding a microprocessor programmed with a prognostication algorithm on a vehicle.

4 Claims, 2 Drawing Sheets

On-Board Predictor → Modeling & Simulation creates probability of a node for a given set of inputs which are controlled and creates an observed set of outputs Run all inputs each time to change a model and simulation (computationally intense)

Fault Determination
1) Faster
2) More accurate
3) Requires less infrastructure

METHOD AND APPARATUS FOR PROVIDING ON-BOARD DIAGNOSTICS

RELATED APPLICATIONS

This Application claims rights under 35 USC §119(e) from U.S. Application Ser. No. 61/342,133 filed Apr. 9, 2010, the contents of which are incorporated herein by reference.

FIELD OF THE INVENTION

This invention relates to the provision of on-board diagnostics for vehicle fleet maintenance and more particularly to the embedding of a microprocessor programmed with a prognostication algorithm on a vehicle.

BACKGROUND OF THE INVENTION

As discussed in U.S. patent application Ser. No. 12/548,683 by Carolyn Spier filed on Aug. 27, 2009, assigned to the assignee hereof and incorporated herein by reference, prognostication algorithms have been utilized to predict faults in the operation of vehicles. More importantly the prognostics algorithm, referred to herein as the PRDICTR algorithm, is used to analyze data from vehicles at a central or remote location where the algorithms can be run on relatively complex large fast computers. As originally described, the PRDICTR algorithms are computationally intense and were developed mainly for Class 8 vehicles which are greater than 30,000 pounds gross vehicle weight. Even if the prognostication algorithms are run at a vehicle, they require computational assets that are far in excess of those that can be offered by microprocessors. Thus hosting a prognostication algorithm on a vehicle requires not only a considerable amount of computer power, but also a considerable amount of space.

The problem therefore becomes is how to embed prognostication in lightweight vehicles where only microprocessors are available for performing any on-board computation. There is therefore a requirement for a stripped down version of the prognostication algorithm to be able to operate on smaller processors such as microprocessors.

SUMMARY OF INVENTION

A prognostication algorithm is provided for use in lightweight vehicles that can be run on local microprocessors in which the prognostication algorithms are altered to be able to operate on the smaller processors. In one embodiment these algorithms are referred to as PRDICTR Light or on-board diagnostic vehicle OBD2 algorithms.

In order to provide a stripped down version of the prognostication algorithm, a modified algorithm is utilized that reconfigures the failure modes and effects analysis which is the front end of the prognostication algorithm. After providing a stripped down version of the prognostication algorithm, one must then find and apply reasoners that operate faster in this kind of environment.

Once having provided a stripped down PRDICTR algorithm that exhibits appropriate validity, then this algorithm is embedded into the smaller vehicles.

In order to provide the stripped down version of the PRDICTR algorithm, it is noted that PRDICTR algorithm is ordinarily configured by modeling and simulation to create an acceptable probability for a node for a given set of inputs and an observed set of outputs. In the prior art, the on-board PRDICTR algorithm runs all inputs each time to change the model and simulation. This is of course computationally intense.

Rather than running all inputs each time one wishes to change a model and simulation, in the subject invention the PRDICTR algorithm is run at the point of performance for a number of inputs. Then for a given output the input $I_y$ and the output $O_x$ is assigned a probability, with the PRDICTR algorithm then developed based on an acceptable probability. Once the PRDICTR algorithm has been developed based on the probability of one input and one output, modeling and simulation is utilized to create a modified PRDICTR algorithm, with this algorithm being embedded at the point of performance on a microprocessor. The result is improved fault determination which is faster, more accurate and requires less infrastructure than the prior instantiation of the prognostication algorithms.

In summary, on-board diagnostics for fleet maintenance is improved by embedding a microprocessor programmed with a prognostication algorithm on a vehicle.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
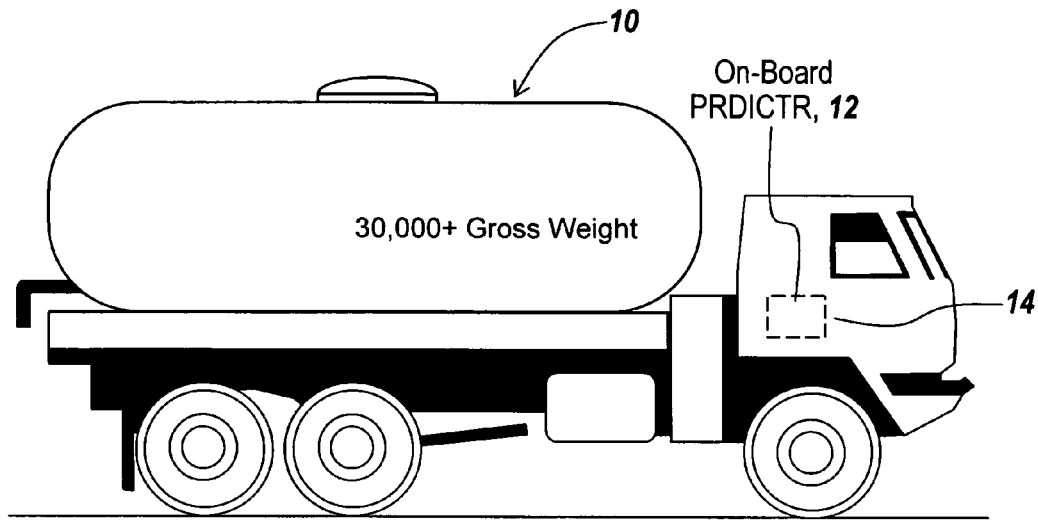
FIG. 1 is a diagrammatic illustration of a prior art 30,000 plus gross ton vehicle having an on-board PRDICTR algorithm within the cab of the vehicle.

As can be seen from FIG. 1, the prior PRDICTR algorithms are utilized on Class 8 vehicles those such as vehicle 10 that are 30,000 plus gross weight vehicles, in which the on-board PRDICTR algorithm 12 is run on an embedded computer 14 within the vehicle.

The size and computational capabilities of computer 14 are not those associated with microprocessors, but rather these computers have massive computational power, unsuitable for use in light vehicles due to size and complexity.

Figure 2:
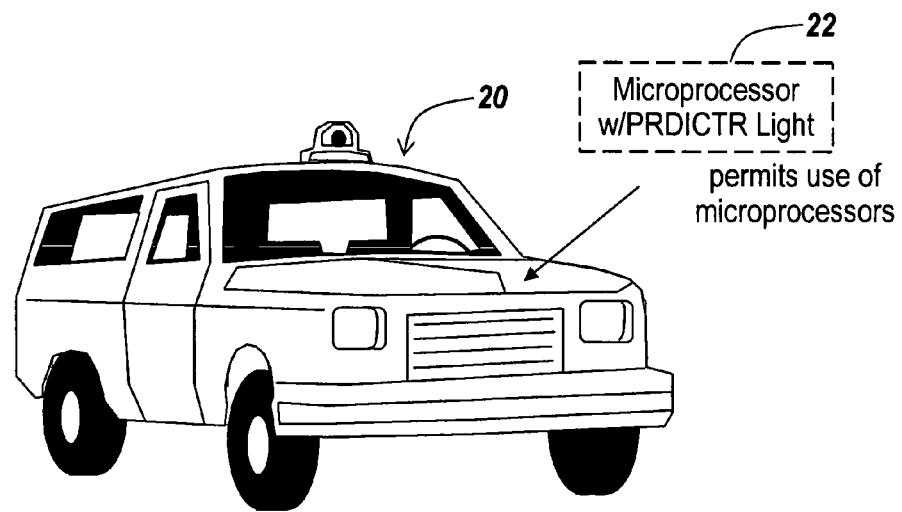
FIG. 2 is a diagrammatic illustration of a light vehicle in which a microprocessor with a PRDICTR Light algorithm is utilized to permit the use of microprocessors.

Referring to FIG. 2, a light vehicle 20 includes a microprocessor with a light version of the PRDICTR algorithm as illustrated at 22, with the microprocessor being embedded in the vehicle. The algorithm takes inputs from selected vehicle sensors and provides prognostic predications of vehicle failure modes. It is the purpose of the subject invention to provide a PRDICTR Light version of a prognostication algorithm to permit the use of microprocessors by eliminating running massive numbers of inputs each time in order to exercise the prognostication algorithm.

Figure 3:
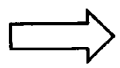
FIG. 3 is a listing of the on-board PRDICTR prior art requirements for modeling and simulation that creates a probability of a node for a given set of inputs, indicating that all inputs must be run each time in order to change the model and simulation used in the prognostication algorithm; and, FIG. 4 is a diagrammatic illustration of a set of inputs and outputs that describe the operation of a system at a point of performance, in which selected inputs and outputs are analyzed as to probability, thereby to be able to develop a stripped down PRDICTR algorithm based on acceptable probability, with the stripped down PRDICTR algorithm embedded at the point of performance.

As shown in FIG. 3, it was the practice hereinbefore when using an on-board PRDICTR to provide modeling and simulation that would describe the probability of a node for a given set of inputs and an observed set of outputs. Thus, for a potential failure mode in a vehicle, it was necessary to run all of the inputs from all of the sensors each time it was necessary to change a model and simulation. This is an incredibly and computationally intense process; and one not readily adapted to light vehicles where only microprocessor processing is available.

Figure 4:
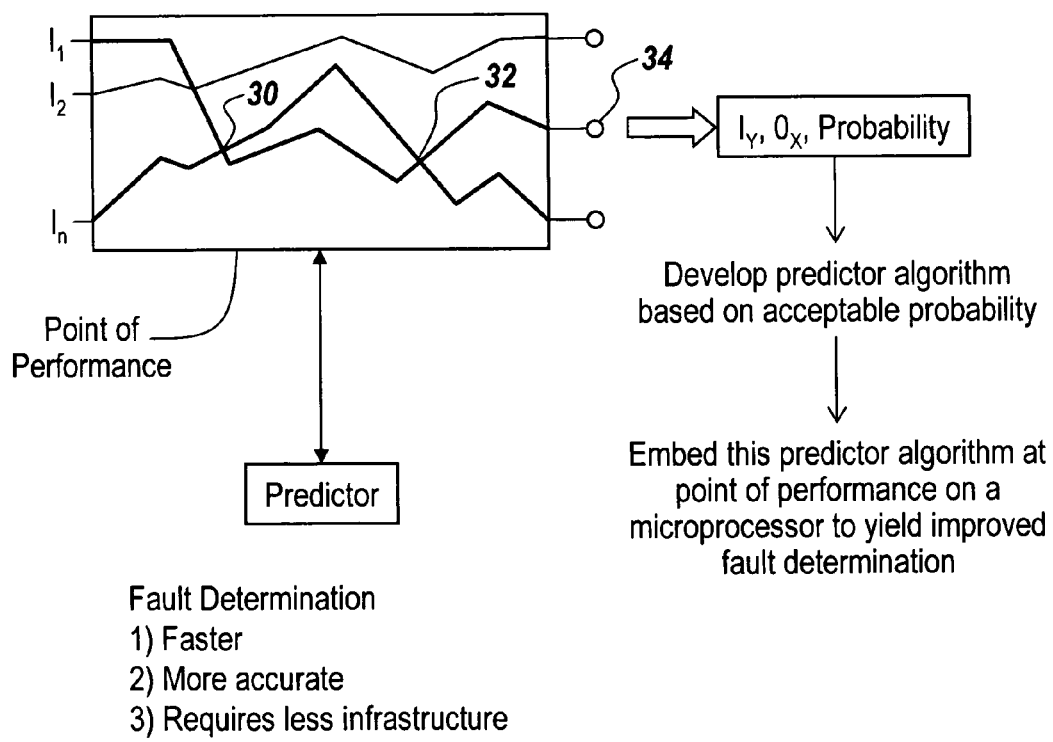

Referring to FIG. 4, it is possible to develop a stripped down prognostication algorithm by providing a large number of inputs and a large number of outputs, and then ascertaining the probability for a given input and a given output. This involves a reduced data set wherein for instance the interaction of input $I_1$ with input $I_n$, for instance at a node 30, and again at a node 32 produces an output 34 having an ascertainable probability. Having ascertained that the probability is sufficiently high, one can develop a PRDICTR algorithm and embed this PRDICTR algorithm at the point of performance on a microprocessor. The result is improved fault predictions and especially fault predictions that can be made at the vehicle and on common microprocessors. The result is improved fault determination which is faster, more accurate and requires less infrastructure.

Thus, what is developed is the ability to slim down the standard PRDICTR algorithm by sensing only a few of the input variables and developing a PRDICTR algorithm based on the result of these particular inputs.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A system for providing a computationally less intense prognostication algorithm for a monitored lightweight vehicle to provide a fault determination comprising:
    a monitored lightweight vehicle, with a gross weight less than 30,000 pounds and having microprocessors configured to perform on-board diagnostics, comprising nodes, wherein the monitored lightweight vehicle performing a function in which the implementation of the function takes place at a number of physically spaced apart points that correspond to the nodes;
    a microprocessor being embedded in the monitored lightweight vehicle at a point of performance for providing a fault determination, wherein the point of performance comprises at least one node,
    wherein said microprocessor being programmed with a stripped down version of a prognostication algorithm, wherein the stripped down version of the prognostication algorithm is developed by:
        developing the prognostication algorithm by utilizing selected input sets of said at least one node that first determines a probability of one output as having a predicted value at one input of the selected input sets, wherein only said one input and said one output that describes operation of said monitored vehicle is used to determine the probability of said one output, and
        developing said stripped down version of the prognostication algorithm by utilizing result of analysis of one input and one output, comprising:
            developing the stripped down version of the prognostication algorithm by utilizing modeling and simulation based on the probability of said one output having said predicted value at said one input such that said stripped down version of the prognostication algorithm operates not directly on said one output but on the probability of said one output.

2. The system of claim 1, wherein multiple inputs are utilized with a single output for determining the probability of said output.

3. The system of claim 2, wherein when the probability of a node is above a predetermined threshold, the corresponding inputs and output are used in the modeling and simulation to develop said stripped down version of the prognostication algorithm.

4. The system of claim 1, wherein said one input and said one output determine the probability at a predetermined node in the monitored vehicle.

* * * * *